United States Patent Office
2,911,902
Patented Nov. 10, 1959

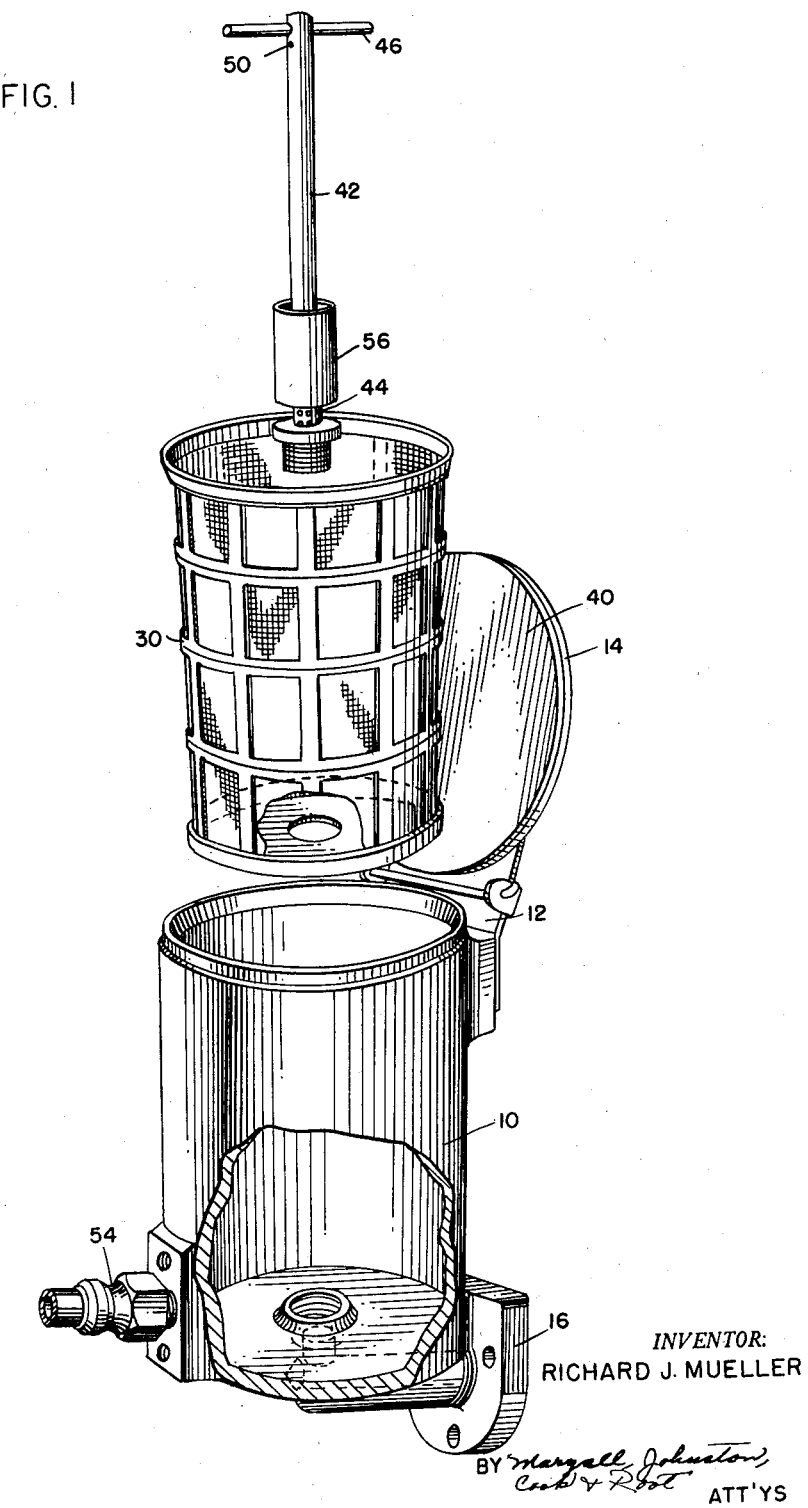

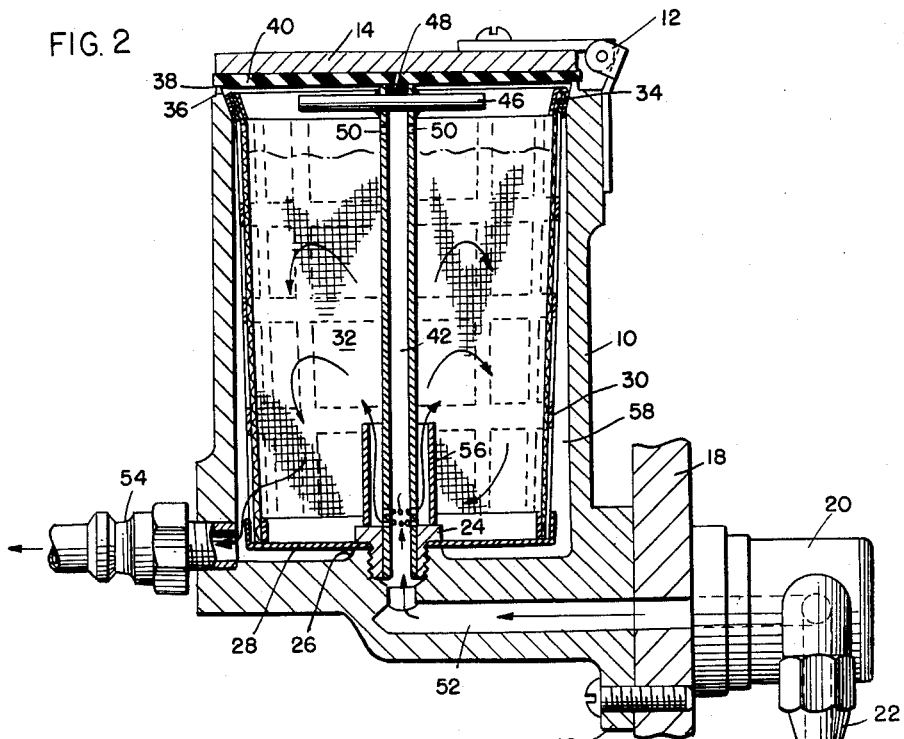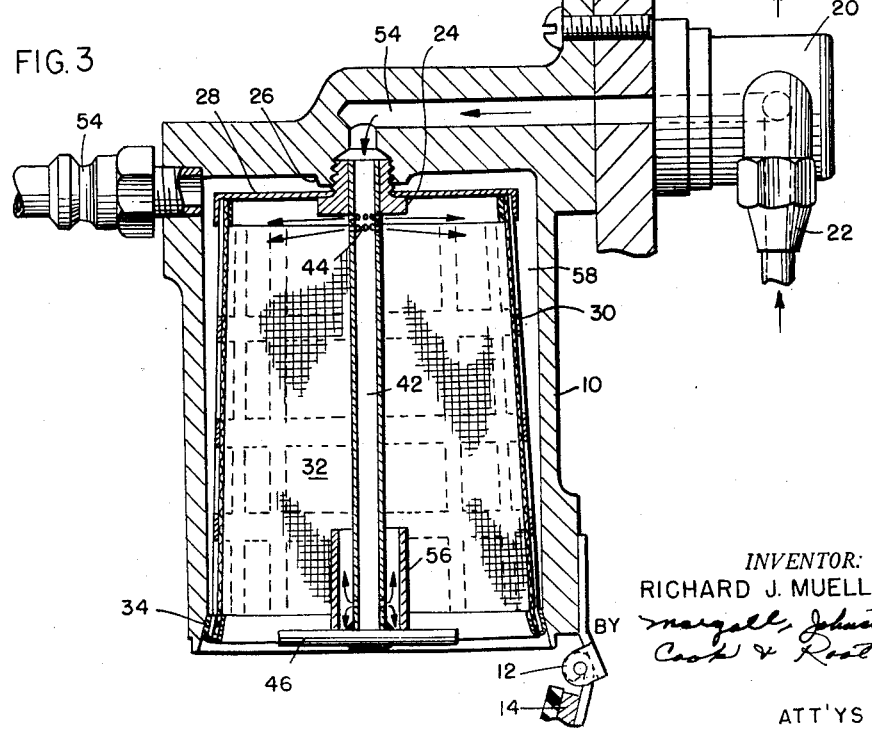

2,911,902

APPARATUS FOR CIRCULATING A LIQUID THROUGH A BODY OF SOLIDS

Richard J. Mueller, Franklin Park, Ill., assignor to Automatic Canteen Company of America, Inc., Chicago, Ill., a corporation of Delaware Application January 11, 1957, Serial No. 633,799

10 Claims. (Cl. 99—289)

This invention, in general, relates to apparatus for circulating a liquid through a body of particulate solids. An important aspect of the invention is apparatus for circulating hot water through a body of ground coffee to produce brewed coffee.

The apparatus of this invention is eminently suitable for the preparation of coffee in commercial eating establishments such as restaurants and in coin-operated vending machines. The preparation of coffee in large quantities, as is common in a large number of restaurants and the like, often gives a coffee with an "off" taste. Coffee prepared in large urns develops on standing, with the application of heat to keep the coffee in a hot state, a strong or bitter taste and, hence, does not have the desirable flavor characteristics of "home brewed" coffee. In the case of vending machines, the same problems arise where coffee is brewed and stored in large batches. Further, the use of "instant coffee" in vending machines has not proven to be entirely satisfactory from a consumer acceptance standpoint.

This invention relates primarily to a coffee brewer for preparation of relatively small quantities of brewed coffee in automatic or semiautomatic machines. The apparatus is eminently suitable for the preparation of coffee at a commercial level as in restaurants and vending machines. The brewer is constructed in a manner which facilitates the filling, brewing and emptying functions on an automatic or semiautomatic basis.

It is, therefore, an object of the present invention to provide apparatus for brewing coffee, which apparatus is suitable for use in the vending of coffee on a commercial basis.

Another object is to provide apparatus for providing circulation of a liquid through a body of solids.

A further object is to provide apparatus for effective circulation of a liquid through a body of solids, in which the wetted solids are readily discharged. Other objects will appear hereinafter.

An embodiment of the invention is illustrated in the drawings wherein:

Fig. 1 is an exploded, perspective elevation of the apparatus with sections thereof broken away;

Fig. 2 is a cross-sectional view of the assembled apparatus of Fig. 1 in a position for circulating a liquid through a body of solids; and, Fig. 3 is a cross-sectional view of the apparatus in a discharging position.

The embodiment of the apparatus of the present invention illustrated in the drawings comprises a brewing vessel 10 having a hinge 12 for lid 14. The brewing vessel is mounted on mounting plate 16 connected to a rotatable base plate 18. A swivel connection 20 is provided at the opposite side of said base plate, said swivel connection 20 being connected to a liquid supply conduit 22.

A flanged nipple 24 is threaded in the bottom of the brewing vessel 10 on raised portion 26. A base 28 of a foraminous container is held in position in the brewing vessel by the flanged nipple 24. The foraminous container comprises a supporting frame 30 for wire screen or other foraminous material 32. The rim of said container is a U-shaped metal ring 34 folded about the edge of the wire screen 32 and frame 30 and has an outward flare. The flaring ring 34 rests on an annular flaring inner wall portion 36 of the brewing vessel 10—providing an effective seal between the foraminous container and the inner wall of the brewing vessel 10. The upper wall of the brewing vessel 10 terminates in a relatively sharp edge 38 upon which rubber gasket 40 rests when the lid is in a closed position to seal the brewing vessel against leakage.

A central tube 42 is press-fitted in the nipple 24. The tube 42 has apertures 44 just above the surface of the flanged portion of the nipple 24. A handle 46 extends through and is secured in the central tube 42 at the opposite, closed end 48. Apertures 50 are also provided at the opposite end of said tube.

The liquid is supplied to the apparatus through supply passage 52 which connects the tube 42 with the supply conduit 22. After the liquid has passed through the solids in the foraminous container it is discharged into discharge conduit 54, which has a swivel joint therein.

An open-ended cylindrical baffle or sleeve 56 surrounds the tube 42 and has an internal diameter substantially larger than the outer diameter of the tube 42. The cylindrical baffle 56 is loosely mounted so that it slides up and down around the tube 42 for a purpose described hereinafter.

In describing the operation of the apparatus, reference will be made to the specific procedure for brewing coffee by circulating hot water through a body of ground coffee. It will be understood, however, that other liquids and solids may be used in a like manner. The apparatus is assembled by placing the foraminous basket in the brewing vessel 10. The flaring ring 34 against the flaring portion 36 of the inner wall of the brewing vessel 10 provides a seal against escape of coffee grounds into space 58. The foraminous container is shaped to provide an annular space 58 between the container and the inner walls of the brewing vessel 10. The basket is held in this position by threading the flanged nipple 24 into the bottom of the brewing vessel 10 by rotating the handle 46 of the tube 42.

The assembled device is filled with ground coffee and the lid 14 is closed. The closing may be done manually or by any suitable connection in the automatic coffee maker such as that shown in Jones Patent No. 2,718,843. The lid may be locked in any suitable manner either manually or automatically such as that shown in the aforesaid Jones patent.

When the lid is closed, hot water is supplied through conduit 22 and passage 52 into the central tube 42. The brewing position is illustrated in Fig. 2. The hot water passes mainly through apertures 44 of the tube 42 and is deflected upwardly by the cylindrical baffle 56. A small amount of water is discharged through aperture 50. The streams from apertures 50, at the relatively low rate of flow during the brewing cycle, drop on the surface of the ground coffee—permeating through the upper portion of the body of the ground coffee. The hot water circulates through the body of ground coffee and then passes through the wire screen 32 into the annular space 58. The coffee produced by the contact of the hot water and the ground coffee is discharged through discharge conduit 54 to a suitable storage vessel.

After the brewing cycle is complete the hot water is shut off and the base plate 18 is rotated to invert the brewing vessel 10 for discharge of the coffee grounds. With the lid 14 open and the brewing vessel in an inverted position (Fig. 3) the loosely mounted baffle 56 falls to the opposite end of the central tube 42 as the main body of coffee grounds falls out of the container. Washing water is then supplied through supply conduit 22 and supply passage 52 into the central tube 42. The major portion of the washing water is discharged through apertures 44. As the water and grounds pass down the screen 32, they wash off most of the remaining grounds clinging to the screen. The streams of water emitting from apertures 50 remove any coffee grounds wedged between the cylindrical baffle 56 and the tube 42. If these grounds are not removed, they may prevent the cylindrical baffle 56 from falling back to the position shown in Fig. 2 for the next brewing cycle.

The brewer herein described is eminently suitable for automatic brewing of coffee in relatively small quantities, e.g., 10-cup or 20-cup quantities. In an automatic operation, the empty apparatus with the lid held open is rotated by the rotatable plate 18 to a substantially vertical position, at which point a metering chamber containing freshly ground coffee is opened and a measured quantity of ground coffee is discharged into the foraminous container. The lid 14 is then closed and locked with the brewer stopped in a substantially vertical position. A measured quantity of hot water is then admitted and circulated through the ground coffee. At the completion of the brewing cycle the flow of hot water is stopped, and rotation of the brewing vessel is continued. As the vessel rotates the lid is released and falls open as the brewing vessel approaches an inverted position. During the rotation toward an inverted position of the brewing vessel, the moist coffee grounds are discharged, and washing water is discharged as described above. The brewing vessel is then stopped in a rest position and is ready for another cycle. This automatic operation may be accomplished by any suitable apparatus, e.g., that shown in the aforesaid Jones patent.

Other modifications and variations of the invention may be made without departing from the spirit and scope of the invention herein described.

The invention is hereby claimed as follows:

1. Apparatus for circulating a liquid through a body of particulate solids which comprises: a foraminous container; means for mounting said container for pivotal movement about a substantially horizontal axis; a tube extending radially with respect to said horizontal axis and longitudinally of said container, said tube having a group of radial apertures adjacent the bottom of said container; and a baffle loosely mounted about said tube with the inner wall of said baffle spaced from the outer wall of said tube and slidable thereon, said baffle adapted to rest on a surface at the bottom of said container and divert the flow of liquid emitting from said apertures upwardly into a body of particulate solids, said baffle adapted to rest on a surface at the bottom of said container when the latter is in an upright position to divert the flow of liquid emitted from said group of apertures adjacent the bottom of said container upwardly into a body of particulate solids in said foraminous container and, upon inversion of said container, to slide to a position away from said apertures, whereby the streams of liquid emitted from said group of apertures near the bottom of said container are not interrupted by said baffle, but are directed against the side wall of said foraminous container to wash down said side wall with said liquid.

2. Apparatus for circulating a liquid through a body of particulate solids which comprises: a foraminous container; means for mounting said container for pivotal movement about a substantially horizontal axis; a tube extending radially with respect to said horizontal axis and longitudinally of said container substantially centrally therein, said tube having a group of radial apertures opening into said container and located adjacent the bottom of said container; and a cylindrical baffle surrounding said tube and slidably mounted thereabout, the internal diameter of said baffle being somewhat larger than the outer diameter of said tube, said baffle adapted to rest on a surface at the bottom of said container when the latter is in an upright position to divert the flow of liquid emitted from said group of apertures adjacent the bottom of said container upwardly into a body of particulate solids in said foraminous container and, upon inversion of said container, to slide to a position away from said apertures, whereby the streams of liquid emitted from said group of apertures near the bottom of said container are not interrupted by said baffle, but are directed against the side wall of said foraminous container to wash down said side wall with said liquid.

3. Apparatus for circulating a liquid through a body of particulate solids which comprises: a foraminous container; means for mounting said container for pivotal movement about a substantially horizontal axis; a tube extending radially with respect to said horizontal axis and longitudinally of said container substantially centrally therein, said tube having a group of radial apertures opening into said container and located adjacent the bottom of said container, said tube having an additional set of radial apertures opening into said container and spaced from said first-mentioned apertures; a cylindrical baffle surrounding said tube and slidably mounted thereabout for movement by gravity when said container is rotated, the internal diameter of said baffle being somewhat larger than the outer diameter of said tube; and means for arresting movement of said baffle in one rest position wherein said baffle surrounds said group of radial apertures and in another rest position wherein the baffle surrounds said additional set of apertures, said baffle adapted to rest on a surface at the bottom of said container when the latter is in an upright position to divert the flow of liquid emitted from said group of apertures adjacent the bottom of said container upwardly into a body of particulate solids in said foraminous container and, upon inversion of said container, to slide to a position away from said apertures, whereby the streams of liquid emitted from said group of apertures near the bottom of said container are not interrupted by said baffle, but are directed against the side wall of said foraminous container to wash down said side wall with said liquid.

4. Apparatus for circulating a liquid through a body of particulate solids which comprises: a foraminous container; means for mounting said container for pivotal movement about a substantially horizontal axis; a tube extending radially with respect to said horizontal axis and longitudinally of said container substantially centrally therein, said tube having a group of radial apertures opening into said container and located adjacent the bottom of said container, said tube having an additional set of radial apertures opening into said container and spaced from said first-mentioned apertures, said tube further being closed at a point beyond said additional apertures; a cylindrical baffle surrounding said tube and slidably mounted thereabout for movement by gravity when said container is rotated, the internal diameter of said baffle being somewhat larger than the outer diameter of said tube; and means for arresting movement of said baffle in one rest position wherein said baffle surrounds said group of radial apertures and in another rest position wherein the baffle surrounds said additional set of apertures, said baffle adapted to rest on a surface at the bottom of said container when the latter is in an upright position to divert the flow of liquid emitted from said group of apertures adjacent the bottom of said container upwardly into a body of particulate solids in said foraminous container and, upon inversion of said container, to slide to a position away from said apertures, whereby the streams of liquid emitted from said group of apertures near the bottom of said container are not interrupted by said baffle, but are directed against the side wall of said foraminous container to wash down said side wall with said liquid.

5. In a device for brewing coffee automatically, a pivotally mounted brewing vessel mounted for rotation about a horizontal axis to various positions during the filling, brewing, and emptying cycles, further characterized by a foraminous container mounted in said brewing vessel with a space between a foraminous wall of said container and an inner wall of said vessel, the rim of said foraminous container tightly fitted against the inner wall of said brewing vessel, said foraminous container having a centrally located tube extending radially with respect to said horizontal axis and longitudinally therein, said tube being connected to a source of hot water at the other end and having a group of radial apertures opening into said foraminous container adjacent the bottom thereof, and a baffle surrounding said tube and spaced from said tube, said baffle further being loosely mounted for movement along said tube by gravity when said vessel is rotated, said baffle adapted to rest on a surface at the bottom of said container when the latter is in an upright position to divert the flow of liquid emitted from said group of apertures adjacent the bottom of said container upwardly into a body of particulate solids in said foraminous container and, upon inversion of said container, to slide to a position away from said apertures, whereby the streams of liquid emitted from said group of apertures near the bottom of said container are not interrupted by said baffle, but are directed against the side wall of said foraminous container to wash down said side wall with said liquid.

6. In a device for brewing coffee automatically, a pivotally mounted brewing vessel mounted for rotation about a horizontal axis to various positions during the filling, brewing, and emptying cycles, further characterized by a foraminous container mounted in said brewing vessel with a space between a foraminous wall of said container and the inner wall of said brewing vessel, the rim of said foraminous container tightly fitted against the inner wall of said brewing vessel, said foraminous container having a centrally located tube extending radially with respect to said horizontal axis and longitudinally therein, said tube being connected to a source of hot water at the other end and having a group of radial apertures opening into said foraminous container adjacent the bottom thereof, a hollow cylindrical baffle surrounding said tube and having an internal diameter substantially larger than the outer diameter of said tube, said baffle being loosely mounted for movement along said tube by gravity when said vessel is rotated; the end of said tube in said foraminous container being closed; said tube further having an additional set of radial apertures adjacent said closed end; and means for arresting movement of said baffle in one rest position wherein said baffle surrounds said group of radial apertures and in another rest position wherein the baffle surrounds said additional set of apertures, said baffle adapted to rest on a surface at the bottom of said container when the latter is in an upright position to divert the flow of liquid emitted from said group of apertures adjacent the bottom of said container upwardly into a body of particulate solids in said foraminous container and, upon inversion of said container, to slide to a position away from said apertures, whereby the streams of liquid emitted from said group of apertures near the bottom of said container are not interrupted by said baffle, but are directed against the side wall of said foraminous container to wash down said side wall with said liquid.

7. Apparatus for circulating a liquid through a body of particulate solids which comprises: a container having an end wall and a foraminous side wall for holding a body of particulate solids; means for mounting said container for pivotal movement about a substantially horizontal axis; conduit means extending radially, with respect to said horizontal axis, into said container through an end thereof and terminating in said container, said conduit means having a group of radial apertures positioned in said conduit means in proximity to an end of said container; and baffle means surrounding and spaced from said conduit means and movable along said conduit means by gravity when said container is rotated, said baffle means, when positioned on said tube in surrounding relationship with said group of radial apertures, adapted to divert the flow of liquid emitted from said group of radial apertures into a body of particulate solids in said container and, when in a position about said conduit means away from said group of radial apertures, to permit the streams of liquid emitted from said apertures to be directed against said foraminous side wall to wash down said side wall with said liquid.

8. Apparatus for circulating a liquid through a body of particulate solids which comprises: a cylindrical container having a base wall and a foraminous cylindrical wall for holding a body of particulate solids; means for mounting said container for pivotal movement about a substantially horizontal axis; a straight conduit extending radially, with respect to said horizontal axis, into said container through the center of said base wall, said conduit having a group of radial apertures positioned in said conduit in proximity to the base of said container; and baffle means surrounding and spaced from said conduit means and movable along said conduit means by gravity when said container is rotated, said baffle means, when positioned on said tube in surrounding relationship with said group of radial apertures, adapted to divert the flow of liquid emitted from said group of radial apertures into a body of particulate solids in said container and, when in a position about said conduit means away from said group of radial apertures, to permit the streams of liquid emitted from said apertures to be directed against said foraminous side wall to wash down said side wall with said liquid.

9. Apparatus for circulating a liquid through a body of particulate solids which comprises: a container having an end wall and a foraminous side wall for holding a body of particulate solids; means for mounting said container for pivotal movement about a substantially horizontal axis; conduit means extending radially, with respect to said horizontal axis, into said container through an end thereof and terminating in said container, said conduit means having one group of radial apertures positioned in said conduit means in proximity to an end of said container; said conduit means further being closed at the terminal end thereof and having an additional set of radial apertures adjacent said closed end of said conduit means; baffle means surrounding and spaced from said conduit means and movable along said conduit means by gravity when said container is rotated; and means for arresting movement of said baffle means in one rest position wherein said baffle surrounds said group of radial apertures and in another rest position wherein the baffle means surrounds said additional set of radial apertures, said baffle means adapted to divert the flow of liquid emitted from one of said groups of radial apertures into a body of particulate solids in said container when said container is in an operative position for circulating a liquid through said body of particulate solids and, upon inversion of said container from said operative position, to move to the other rest position and permit liquid being discharged from said last-mentioned group of radial apertures to be directed against said side wall of said foraminous container to wash down said side wall with said liquid and to be simultaneously internally washed by liquid emitted from the group of radial apertures with which said baffle is in surrounding relationship in said inverted position of said container.

10. Apparatus for circulating a liquid through a body of particulate solids which comprises: a cylindrical container having a base wall and a foraminous cylindrical wall for holding a body of particulate solids; means for mounting said container for pivotal movement about a substantially horizontal axis; a straight conduit extending radially, with respect to said horizontal axis, into said container through the center of said base wall, said conduit having a group of radial apertures positioned in said conduit in proximity to the base of said container; said conduit means further being closed at the terminal end thereof and having an additional set of radial apertures adjacent said closed end of said conduit; baffle means surrounding and spaced from said conduit means and movable along said conduit means by gravity when said container is rotated; and means for arresting movement of said baffle means in one rest position wherein said baffle surrounds said group of radial apertures and in another rest position wherein the baffle means surrounds said additional set of radial apertures, said baffle means adapted to divert the flow of liquid emitted from one of said groups of radial apertures into a body of particulate solids in said container when said container is in an operative position for circulating a liquid through said body of particulate solids and, upon inversion of said container from said operative position, to move to the other rest position and permit liquid being discharged from said last-mentioned group of radial apertures to be directed against said side wall of said foraminous container to wash down said side wall with said liquid and to be simultaneously internally washed by liquid emitted from the group of radial apertures with which said baffle is in surrounding relationship in said inverted position of said container.

References Cited in the file of this patent

UNITED STATES PATENTS

| | | |
|---|---|---|
| 95,056 | Von Holten | Sept. 21, 1869 |
| 378,296 | Ehrlick | Feb. 21, 1888 |
| 405,946 | Bulow | June 25, 1889 |
| 411,920 | Hoeder | Oct. 1, 1889 |
| 964,518 | Holley | July 19, 1910 |
| 1,075,727 | Reichert | Oct. 14, 1913 |
| 1,171,022 | Cilette | Feb. 8, 1916 |
| 1,646,022 | Hagel | Oct. 18, 1927 |
| 2,088,966 | Lyons | Aug. 3, 1937 |
| 2,405,751 | McMenamin | Aug. 13, 1946 |
| 2,419,845 | Merrick | Apr. 29, 1947 |
| 2,484,054 | Sharp | Oct. 11, 1949 |
| 2,583,279 | Rudahl | Jan. 22, 1952 |
| 2,718,843 | Jones | Sept. 27, 1955 |